United States Patent
Trimble et al.

[15] 3,672,383
[45] June 27, 1972

[54] METHOD AND APPARATUS FOR TAPPING PIPELINE

[72] Inventors: John Omer Trimble, Malvern; Henry William Demler, Sr., Lebanon, both of Pa.

[73] Assignee: AMP Incorporated, Harrisburg, Pa.

[22] Filed: May 25, 1970

[21] Appl. No.: 40,235

[52] U.S. Cl. ............................................................137/15
[51] Int. Cl. ...................................F16e 41/04, B23b 41/08
[58] Field of Search ........................................137/15, 317, 318; 77/38–41; 156/293, 294, 306

[56] References Cited

UNITED STATES PATENTS

| | | | |
|---|---|---|---|
| 1,872,792 | 8/1932 | Neorr | 251/8 |
| 2,789,934 | 4/1957 | Busbach | 156/294 X |
| 3,176,708 | 4/1965 | Shields | 137/318 |
| 3,481,805 | 12/1969 | Holmes et al. | 156/294 X |
| 3,516,426 | 6/1970 | Toll | 137/318 X |

*Primary Examiner*—M. Cary Nelson
*Assistant Examiner*—David R. Matthews
*Attorney*—William J. Keating, Ronald D. Grefe, Gerald K. Kita, Frederick W. Raring, Jay L. Seitchik and John P. Vandenburg

[57] ABSTRACT

A generally T-shaped tap coupling is positioned in encircling relationship over a pipeline, and is heat shrunk thereover. The tap coupling includes a tap line portion receiving drilling apparatus therethrough which removes a coupon from the sidewall of the pipeline. The drilling apparatus with the coupon retained is partially withdrawn from the tap line portion. A clamping device collapses the sidewall of the tap line portion to prevent escape of conveyed material from the pipeline. The tap line portion is then permanently connected to a coupling of a tap line. The clamping device is removed thereby permitting material from the pipeline to flow through the tap coupling into the tap line.

5 Claims, 6 Drawing Figures

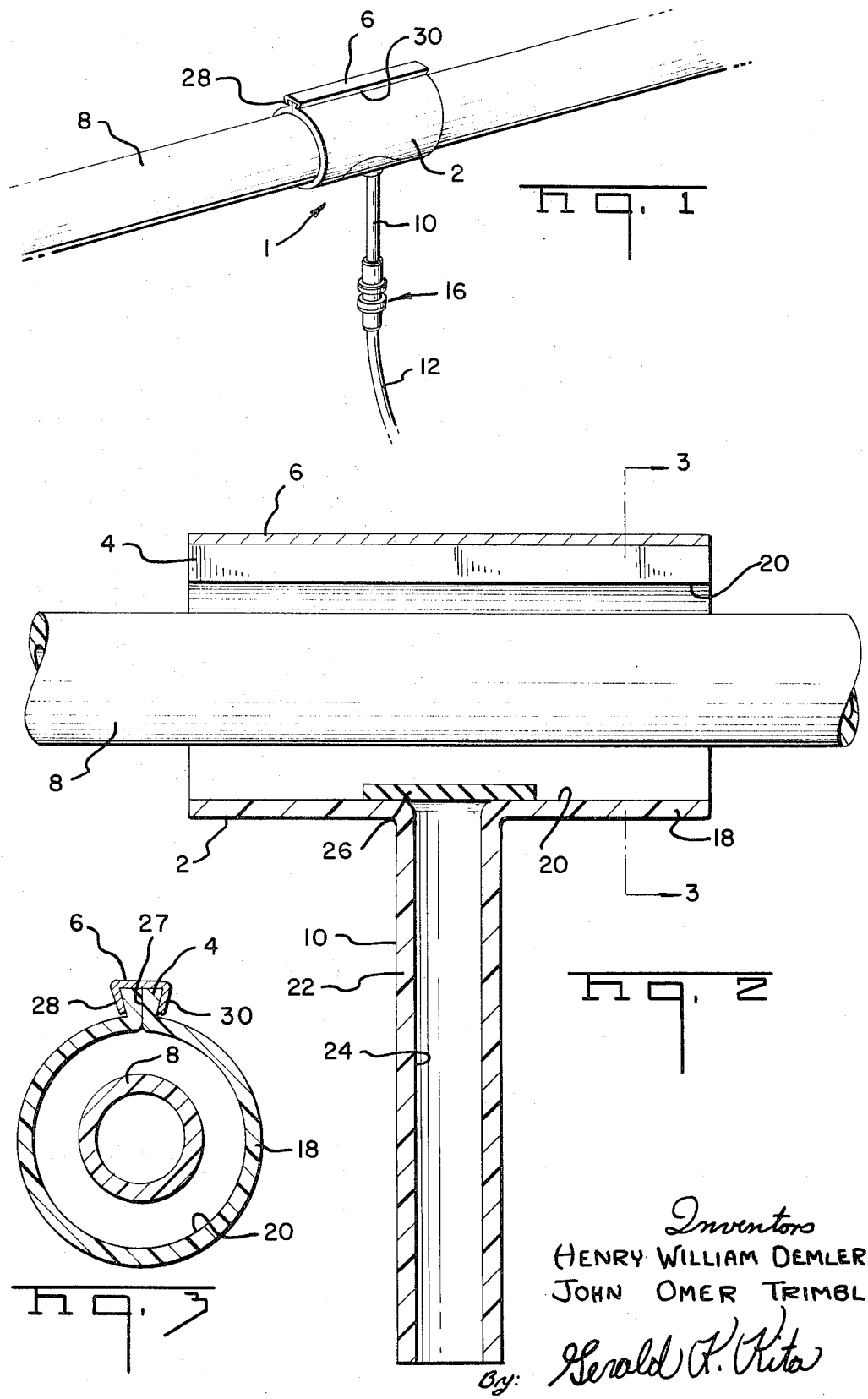

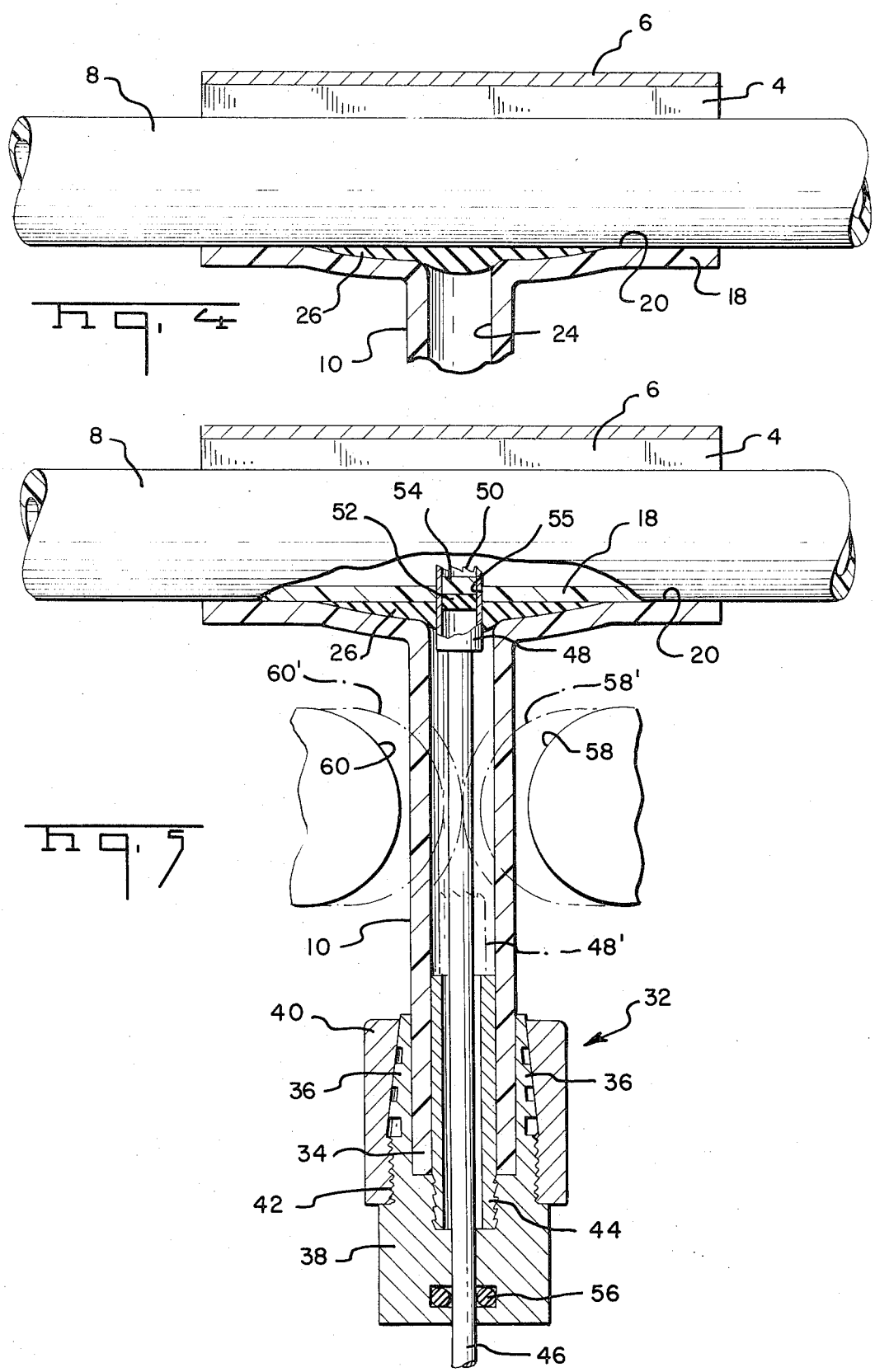

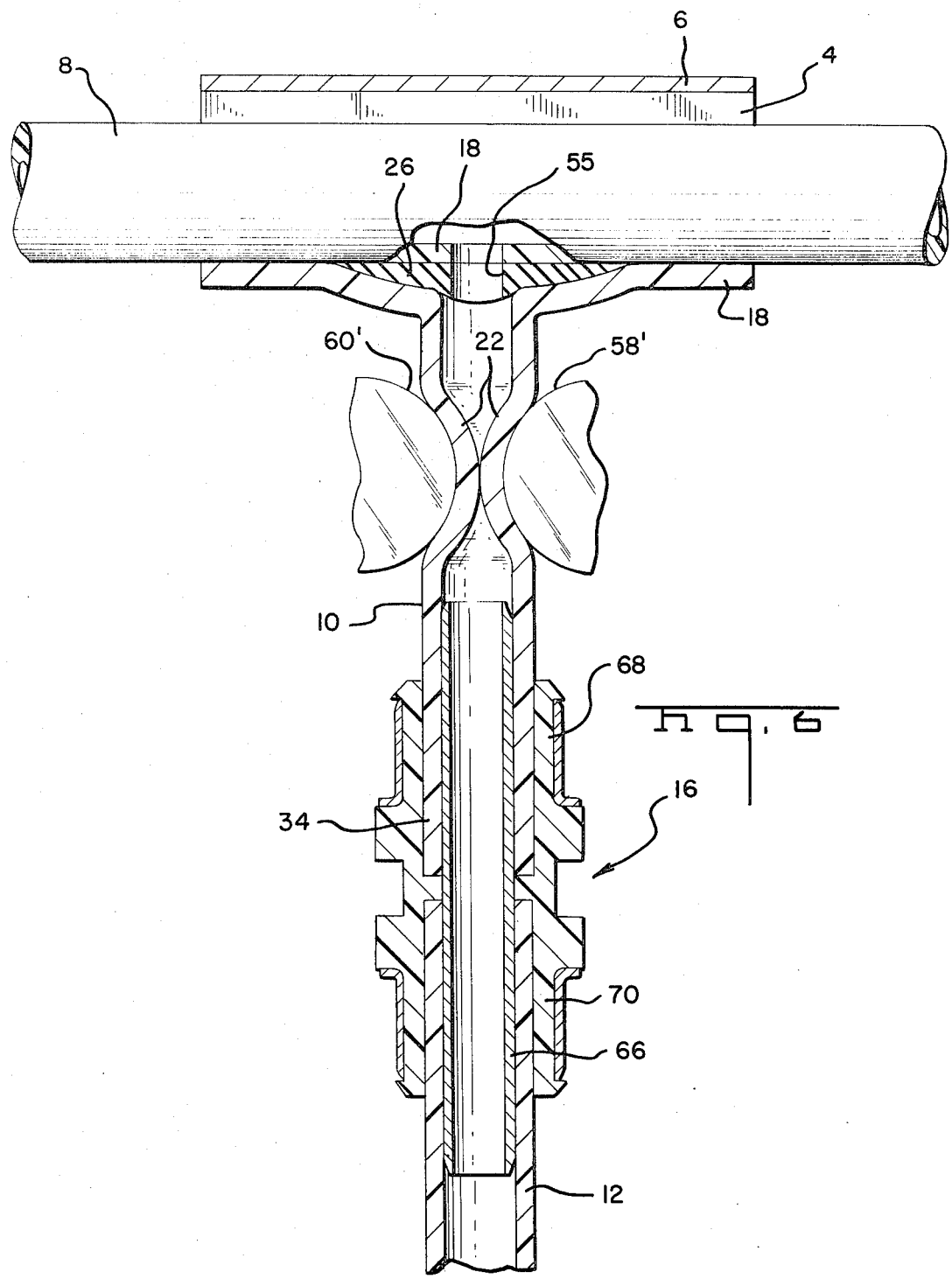

METHOD AND APPARATUS FOR TAPPING PIPELINE

FIELD OF THE INVENTION

The present invention relates to method and apparatus for tapping a pipeline without requiring shut-off of the pipeline.

BACKGROUND OF THE PRIOR ART

Heretofore, tapping of a pipeline was accomplished only upon shutting off the pipeline or providing a tap coupling with expensive and complicated valves to prevent escape of conveyed material from the pipeline during the tapping process. After the valves were turned on, permitting flow of conveyed material through the tapped coupling, they were no longer needed. However, they became a permanent part of the tap coupling and could not be salvaged.

SUMMARY OF THE INVENTION

The present invention provides a method and apparatus for tapping a pipeline without a need for shut-off valves. A preferred embodiment of a tap coupling is heat shrunk over a pipeline and is provided with a tap line portion. A coupon is removed from the pipeline sidewall internally of the tap line portion. A clamping device collapses the sidewall of the tap line portion to prevent escape of conveyed materials from the pipeline without a need for complicated or expensive valves. The tap line portion is then coupled permanently to a tap line. Subsequently the clamping device is removed to permit flow of conveyed materials from the pipeline through the tap line portion and into the tap line as desired.

OBJECTS OF THE INVENTION

It is therefore an object of the present invention to provide method and apparatus for tapping a pipeline without a need for first shutting off the pipeline.

Another object of the present invention is to provide method and apparatus for tapping a pipeline without a need for valves during the tapping process.

A further object of the invention is to provide method and apparatus for tapping a pipeline more quickly, with less labor and less material costs then heretofore available.

Other objects of the invention will become apparent upon perusal of the following detailed description taken in conjunction with the drawing.

BRIEF DESCRIPTION OF THE DRAWINGS

FIG. 1 is a perspective of a pipeline provided thereover with a tap coupling and a tap line portion coupled to a tap line in accordance with the method of the present invention;

FIG. 2 is an enlarged fragmentary elevation partially in section of a tap coupling provided with a sealant material and a tap line portion positioned in encircling relationship over a pipeline;

FIG. 3 is an enlarged section taken along the line 3—3 of FIG. 2;

FIG. 4 is an enlarged fragmentary elevation partially in section of the embodiment shown in FIG. 2, except with the tap coupling and sealant material heat shrunk in encircling relationship over a pipeline;

FIG. 5 is a fragmentary elevation partially in section and with parts broken away to illustrate portions of a drilling apparatus and portions of a clamping device utilized in practice of the method according to the present invention; and FIG. 6 is an enlarged fragmentary elevation partially in section with parts broken away to illustrate portions of a clamping device collapsing the sidewall of a tap line portion, and further with the drilling apparatus removed and a portion of a tap line connected to the tap line portion by a coupling.

DETAILED DESCRIPTION OF THE PREFERRED EMBODIMENTS

With more particular reference to the drawings, there is shown in FIG. 1 a generally T-shaped tap coupling 1 having a sleeve portion 2 of cylindrical configuration and provided longitudinally thereon with a raised ridge portion 4. The ridge portion 4 is provided thereover with a partially encircling clamp 6. Sleeve portion 2 is provided in encircling relationship over a pipeline, a portion of which is shown at 8, and which may comprise a gas main, for example. The sleeve portion 2 is provided, generally centrally thereof with a reduced diameter elongated cylindrical tap line portion 10 connected to a tap line 12 by way of a coupling generally indicated at 16. For example, the tap coupling 1 connects the tap line 12 in communication with the pipeline 8 to permit a portion of the material conveyed within the pipeline to flow into the tap line 12.

To describe more in detail the manner in which the tap coupling 1 is provided over the pipeline 8, reference will be made to FIGS. 2 and 3. As shown in FIG. 2, initially the sleeve portion includes a cylindrical sidewall 18 defining an internal diameter 20. The internal diameter 20 of the sleeve portion 2 is relatively larger than and is radially spaced from the outer diameter of the pipeline 8 in order to permit the sleeve portion to be readily positioned over the pipeline 8 at a desired location. The tap line portion 10 includes a cylindrical sidewall 22 defining an internal diameter 24, which communicates with the internal diameter 20 of the sleeve portion 2 at the intersection of the internal diameters 20 and 24, and which is covered by a disc shaped wafer of sealant material 26, of any well-known type.

With reference to FIG. 3, the spaced relationship between the internal diameter 20 and the outer diameter of the pipeline 8 is illustrated in cross section. Additionally, the ridge portion 4 is shown with a kerf 27 which extends along the entire longitudinal dimension of the ridge portion 4 and bifurcates the same. The kerf allows the sleeve portion 20 to be resiliently deformed to an open condition and placed in encircling relationship over the pipeline. As shown in FIG. 3, the clamp 6 extends longitudinally the entire length of the ridge portion 4 and covers the kerf 27. As shown in FIG. 3, the clamp 6 is generally of inverted U-shaped configuration with projecting portions 28 and 30 secured in partially encircling relationship over the projecting ridge portion 4. For example, the projection portions 28 and 30 may be crimped in abutting relationship against the ridge portion 4 to secure the clamp 6 in partial encircling relationship over the ridge portion 4 and to prevent undesired separation of the bifurcated portions of the ridge portion along the kerf 27 once the sleeve portion is placed over the pipeline.

With the sleeve portion 2 thus located as shown in FIG. 2, heat is applied to the sleeve portion 2 by any well-known technique, thereby causing the sidewall 18 of the sleeve portion 2 to shrink radially in compressive encircling relationship over the pipeline 8. Such application of heat also will cause the sealant 26 to flow from its wafer configuration to a layer configuration, in compression between the shrunken sidewall 18 and the pipeline 8 and in surrounding and covering relationship over the intersection of the communicating internal diameters 20 and 24. Thus, the application of heat causes the sleeve portion 2 to shrink compressibly in encircling relationship over the sleeve 8 to form a generally gas tight seal around the pipeline 8. However, the application of such heat further flows the sealant 26 into a compressed sealant layer further forming a gas tight seal surrounding and covering the internal diameter 24 of the tap line portion 10. For clarity, the sidewall 18 is shown in an exaggerated deformed condition adjacent to the layer 26. In actual practice such deformed configuration is not as definitive.

With the sleeve portion thus in shrunken condition, a drilling apparatus 32, shown in FIG. 5, is secured on the end portion 34 of the tap line portion 10. More particularly, the drilling apparatus 32 includes a plurality of frusto-conical chuck teeth 36 on a tool post 38. A cooperating annular collet 40, threadably secured at 42 to the tool post 38, biases the chuck teeth radially inward in gripping relationship over the end portion 34 of the tap line portion 10. A sleeve 44 is secured to the tool post 38 and is adapted to be received interiorly of the end portion 34 to prevent collapse of the tap line portion sidewall when gripped by the chuck teeth 36. The drill rod 46 is rotatably received through the tool post 38 and extends interiorly of the sleeve 44 and the tap line portion 10. The drill rod 46 is provided at its end thereof with a cylindrical hole cutter 48 with serrations 50 thereon. In operation, the drill rod 46 is rotated by a suitable power source (not shown) to rotate the cutter 48, the serrations 50 penetrating through the sealant layer 26 and the sidewall 18 of the pipeline 8. The hole cutter 48 is hollow as shown in FIG. 5 to retain therein coupons 52 and 54 from the layer 26 and the sidewall 18, respectively. After such cutting and penetration by the cutter 48, it is partially retracted to a position shown in phantom outline at 48' with the coupons 52 and 54 retained therein. Upon removal of the coupons 52 and 54 by retraction of the cutter 48, the internal diameter 24 of the tap line portion will directly communicate with the internal diameter of the pipeline 8 through an orifice 55. An annular seal 56 surrounds the drill rod 46 within the tool post 38 to provide a gas tight seal against the escape of material flowing from the pipeline 8 into the tap line portion 10. With the cutter 46 thus partially retracted, a clamping device having a pair of schematically illustrated clamping jaws 58 and 60 will be utilized to collapse the sidewall of the tap line portion 10.

More particularly, with reference to FIGS. 5 and 6, the clamping jaws 58 and 60 will be actuated toward each other to positions illustrated in phantom outline at 58' and 60' respectively. As shown in FIGS. 5 and 6, such action radially inwardly collapses the sidewall 22 of the tap line portion 10 thereby shutting off the flow of conveyed pipeline material entering the tap line portion 10 through the orifice 55. The clamping jaws are maintained in position shutting off the flow of pipeline conveyed material until the drilling apparatus 32 is removed from the tap line portion 10 and a tap line, a portion of which is illustrated at 62, is connected to the end portion 34 of the tap line portion 10 by a coupling generally illustrated at 64. The coupling may be identified as an AMP-FIT type coupling manufactured by AMP Incorporated, Harrisburg, Pennsylvania. Since the coupling is readily available, the particular details thereof will not be described. It is sufficient that the coupling is identified as having an interior sleeve portion 66 and outer surrounding sleeve portions 68 and 70 which cooperate to couple together the tap line portion 10 with the tap line portion 2. When attachment of the coupling 64 is accomplished, the jaws 58 and 60 are removed from the tap line portion 10. The elastic memory phemonenon inherent in the tap line portion sidewall 22 automatically causes the sidewall 22 to resume its cylindrical configuration as heretofore illustrated in FIGS. 2 and 5.

Thus, what has been described is a method and apparatus for tapping a pipeline involving the steps of, positioning a tap coupling on a pipeline, heat shrinking the tap coupling, removing a coupon from the pipeline, shutting off the flow of pipeline conveyed material at the tap coupling, coupling a tap line to the tap coupling and turning on the flow of pipeline conveyed material at the tap coupling.

Other modifications and embodiments of the present invention include friction welding along the ridge portion 4 to close the kerf 27. Such a technique eliminates the need for the clamp 6 to retain the sleeve portion 2 in a closed position. The preferred embodiments operate as described equally well with a pipeline of metal or plastic construction. The sealant may take the form of a coating interiorly of the sleeve portion 2 instead of the wafer 26 as particularly described.

In the claims:

1. A method of tapping a pipeline, comprising the steps of:
positioning a tap coupling on a pipeline,
heat shrinking the tap coupling over said pipeline,
removing a coupon from the pipeline sidewall,
shutting off the flow of pipeline conveyed material at the tap coupling,
connecting a tap line to the tap coupling, and
turning on the flow of pipeline conveyed material at the tap coupling.

2. The method as recited in claim 1 wherein, said step of removing a coupon further includes the steps of attaching a drilling apparatus to a portion of said tap coupling, and penetrating the sidewall of the pipeline by a portion of said drilling apparatus to remove the coupon.

3. The method as recited in claim 2, and further including the step of partially retracting a portion of the drilling apparatus immediately after removal of the coupon, and
wherein the step of shutting off the flow of pipeline conveyed material further includes the step of clamping a portion of said tap coupling,
and further including the step of, removing said drilling apparatus from said tap coupling immediately before coupling said tap line to said tap coupling, wherein the step of turning on the flow of pipeline conveyed material includes unclamping the tap coupling.

4. The method as recited in claim 1, wherein the step of shutting off the flow of pipeline conveyed material includes clamping a portion of the tap coupling, and wherein the step of turning on the flow of pipeline conveyed material includes unclamping said tap coupling.

5. The method as recited in claim 1, where the step of shutting off the flow of pipeline conveyed material includes the step of, collapsing a portion of the tap coupling, and wherein the step of turning on the flow of pipeline conveyed materials includes the step of restoring the uncollapsed configuration of said tap coupling.

* * * * *